Sept. 29, 1942.    H. RUDOLPH    2,297,248

POROUS MATERIALS AND PROCESS OF MAKING

Filed July 23, 1937

Patented Sept. 29, 1942

2,297,248

UNITED STATES PATENT OFFICE 2,297,248

POROUS MATERIALS AND PROCESS OF MAKING

Hans Rudolph, Bietigheim-on-the-Elbe, Wurttemberg, Germany; vested in the Alien Property Custodian Application July 23, 1937, Serial No. 155,292
In Germany August 21, 1936

2 Claims. (Cl. 18—48)

My invention relates to a new kind of porous materials, more especially for use in filters, diaphragms, etc., and to the process of making such materials.

It is an object of my invention to provide a new filtering material having favorable properties which render it superior in certain respects to other materials hitherto applied to the same purpose.

The new porous material according to this invention is made from thermoplastic artificial resins and preferably from members of this class of compounds which acquire adhesive properties when subjected to a softening treatment, for instance by heating or by being acted upon with a solvent or swelling or softening agent. In the production of the porous materials artificial resins in pulverulent, granular or fibrous form may be used and the porous bodies producible from these resins can be molded and shaped within wide limits according to the requirements of each individual case. Owing to the character of the starting material the bodies thus obtained are not brittle, but elastic and are therefore able to give way to the forces acting thereon without splintering or breaking.

Filters made in accordance with this process are much lighter in weight than mineral filters and owing to their greater mechanical strength the plates or other filter bodies produced with their aid may be much thinner and larger than similar bodies made of mineral matter or of other material of lower elasticity. These properties of the new material also involve the possibility of effecting a considerable saving in the means of fixing these bodies in place in the filters, so that also a great saving in space is obtained. In view of this circumstance filters made in accordance with this invention offer to the liquid to be filtered only little resistance whereby their filtering capacity is greatly increased.

In view of the constitution of these materials no expensive calcination process involving heating up to and beyond 1000° C. is required.

In the manufacture of the porous material according to this invention the individual, comparatively small particles of the thermoplastic artificial resin are agglomerated in such manner that the body formed is porous to the extent determined by the particle size.

In the manufacture of the new porous bodies I may start from well-known artificial resins. I have found it particularly suitable to start from a polymerization product of alpha-methylacrylic acid, which is obtained by treating this compound with a low-molecular alcohol, preferably with methylalcohol, for instance the product corresponding to the formula

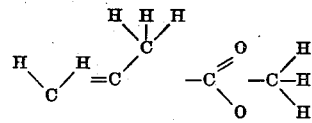

Porous bodies produced from this compound are transparent and any impurities present can therefore easily be ascertained. The porous bodies are not affected by any concentrated alkalies, concentrated hydrochloric acid, hydrofluoric acid, diluted mineral acids nor by oils and benzines.

In certain cases I have found it advantageous to start from a vinyl polymerizate of hydrocarbon character, for instance the compound known under the trade-name "Luvican."

Particles of the starting material of correspondingly small size are combined with each other in a suitable manner, care being taken that the pore-like cavities between contacting particles are not clogged. I may use a suitable cement for agglomerating the particles, but preferably the artificial resin itself may serve as agglomerant, for then a physically and chemically homogeneous body is obtained.

In the production of such porous bodies I may for instance act with a solvent on the particles of such artificial resin in order to temporarily soften their surface and to thereby further agglomeration.

I may for instance start from substances which are soluble in organic solvents, more especially solvents which can readily be removed by known technical means, such as for instance ketones, esters, ethers and the like, which are removable by reduced pressure or by heating. The comminuted starting material is introduced into such a solvent and after the surface layers of the particles have been softened down to a suitable depth, they are compressed, whereupon the solvent is removed again, for instance by evaporation. Before applying the solvent I prefer dissolving therein a certain proportion of the same or some other suitable artificial resin which suffices to reduce the dissolving capacity of the solvent, which then mainly acts only towards softening the surface layers of the particles without dissolving a material part thereof. I even prefer to dissolve in the solvent, before applying it to the agglomeration of the artificial resin, a quantity of such resin approaching the saturation limit, for it is of no avail whether the greater part of the porous body to be produced is built up from the resin particles treated with the solvent or from the resin dissolved in the solvent preparatory to such treatment.

I may however also shape or mold the pulverulent, granular or fibrous mass, before adding a solvent or softener or a cement and I may then only act on this mass with the solvent or softener or the agglutinant in vapor or gas form. As solvents or softeners I may for instance use benzol, alcohol, aceton, or acetic ester.

In the production of porous bodies I may for instance proceed as follows:

The granular mass, such as a polymerization product of alpha-methylacrylic ester is filled in a mold. A suitable preferably organic solvent of the kind mentioned above is now introduced into the mold as a vapor, until the surface layers of the grains have assumed the character of an agglomerant, whereupon pressure is made to act on the mass enclosed in the mold in order to cause the grains to agglomerate at the points of contact.

By using a gaseous or vaporous solvent or softener I obtain a particularly quick and uniform action on all the grains. This action can be expedited by operating at a termepature above normal.

The vapors of the solvent or softener may be produced by passing a vigorous air current through or over a volatile solvent or softener.

I obtain a particularly thorough and uniform action of the vapor or gas on the grains, fibres or the like by so shaking or otherwise moving the mold, in which the material is arranged that all parts of the surface of the grains or the like are exposed to the action of the vapors.

Instead of employing a solvent or softener, I may also start from artificial resins which soften under the influence of heat, such as for instance polymerisates of acrylic esters or polyvinyl chlorides of hydrocarbon character which, when heated until they become soft, can be compressed at this temperature and allowed to cool again. Heating may be effected by any suitable means, for instance by electrical resistance heating. Since the softening point of the starting materials is comparatively very low, for instance between 100 and 150° C., this method of heating encounters no difficulties and can be carried through in an economical manner. By compressing the mass at the softening temperature and the subsequent cooling the particles are firmly cemented together so that an altogether homogenous porous shape is obtained.

Most of the artificial resins can be used under the form of more or less regularly shaped grains for special purposes, if a fibrous structure is desired, as in the case of diaphragms for electrolytical processes, for instance the electrolysis of alkali chlorides, I have found the vinyl polymerisate of hydrocarbon character mentioned above to be patricularly suitable. This compound has a structure resembling that of asbestos and it is stable at a temperature above 100° C., possessing for instance considerable mechanical strength at a temperature as high as 140° and withstanding even heating to considerably higher temperatures for a short time.

If the starting materials used, for instance the vinyl polymerisate last mentioned, are water repellent, the capacity of the filter at a given difference of pressure can be considerably raised or the pressure required to force a predetermined quantity of liquid through the filter greatly reduced if the porous body is wetted with a suitable wetting agent, for instance a sulfonate of an organic compound, such as the substance sold under the trade-name "Nekal."

For certain purposes bodies possessing a double-porosity, i. e. bodies in which a layer with small pores is superposed to a layer with larger pores, are preferred as a filter body or diaphragm.

According to the process here described filter bodies composed of layers of different porosity can be produced on a large scale with layers of absolute uniformity. I prefer producing the two layers, the layer with large pores and the layer with fine pores, separately, superficially softening each layer, either by means of a solvent or by heating and shaping it by subsequent slight compression.

In connection with plates this process encounters no difficulty whatever, but it is important that also other bodies, for instance hollow cylinders can easily be produced in this manner. Also in this case the part formed with large pores and the part formed with small pores are made separately, either by directly compressing the mass to impart to it its definite form, or by subsequent machining or by hollowing out a solid piece. The shaping or machining is so carried out that the hollow cylinder formed with small pores has a tight fit on the hollow cylinder with large pores and that on the contacting surfaces being softened, the two cylinders are firmly connected with each other.

Obviously the new process is also applicable to bodies other than cylindrical, for instance to conical bodies. It is thus possible to produce the part formed with fine pores as thin and uniform as required for the effect to be obtained with the filter or diaphragm.

In the drawing affixed to this specification and forming part thereof porous bodies formed with two layers, a layer with large and a layer with small pores, according to this invention, are illustrated diagrammatically by way of example.

Referring to the drawing Fig. 1 is a side elevation of a plate, in which a layer constituted by comparatively large granular particles 1 has superposed to it a layer of relatively small particles 2, the pores between the adjoining particles in layer 1 being of course larger than the pores formed between adjoining particles 2.

Figure 1:
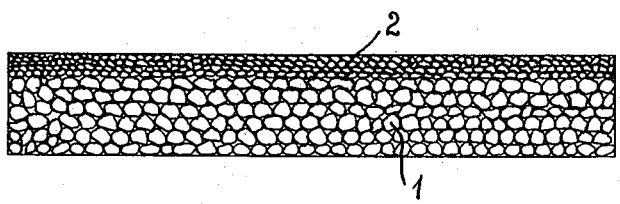
Figures 2, 3:
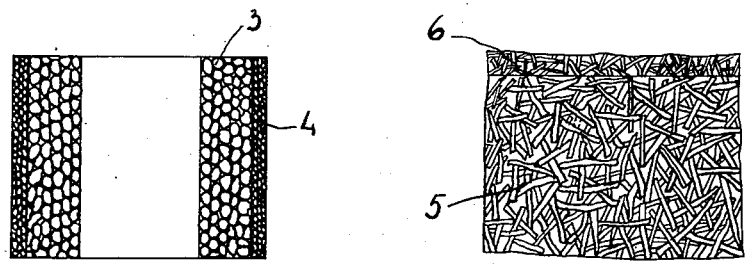
Fig. 2 is an axial section of a hollow-cylindrical filter, in which 3 is the inner layer composed of larger grains, while 4 is an outer layer composed of relatively smaller grains.
Fig. 3 is a cross section of a part of a filter plate formed of agglomerated fibres of plastic material, a layer of larger agglomerated fibres 5 and comparatively larger pores between the fibres being arranged below a layer composed of smaller fibres 6 with relatively smaller pores between them.

Various changes may be made in the details disclosed in the foregoing specification without departing from the invention or sacrificing the advantages thereof.

I claim:
1. As a new article, a porous body suitable for use as a filter or diaphragm, consisting of self-bonded particles of thermoplastic artificial resins selected from the group consisting of acrylic and vinyl resins, parts of the surfaces of said particles being joined to each other with interstices therebetween.

2. A method of the character described comprising the steps of compactly arranging plastic granules in a mold, said arrangement providing voids between the granules charging the mold with the vapor of a solvent for said plastic having a low boiling point whereby said vapor condenses on said granules, and thence immediately distilling off said solvent to limit the action of the solvent and retain voids between said granules.

HANS RUDOLPH.